United States Patent [19]

Lynch

[11] 4,325,266
[45] Apr. 20, 1982

[54] ACCELERATOR/DECELERATOR PEDAL AND SYSTEM

[75] Inventor: Larry W. Lynch, Galion, Ohio

[73] Assignee: Fiat-Allis Construction Machinery, Inc., Deerfield, Ill.

[21] Appl. No.: 131,455

[22] Filed: Mar. 18, 1980

[51] Int. Cl.³ .................... G05G 1/14; G05G 11/00
[52] U.S. Cl. ...................................... 74/482; 74/470; 123/365
[58] Field of Search .................. 74/470, 481, 482; 123/365

[56] References Cited

U.S. PATENT DOCUMENTS

| | | | |
|---|---|---|---|
| 823,742 | 6/1906 | Schmidt | 74/482 |
| 2,429,714 | 10/1947 | Gedstad | 74/482 |
| 2,821,091 | 1/1958 | Benner | 74/482 |
| 4,059,025 | 11/1977 | Waack et al. | 74/482 |

Primary Examiner—Allan D. Herrmann
Attorney, Agent, or Firm—August E. Roehrig, Jr.; John A. Doninger

[57] ABSTRACT

Accelerator/decelerator pedal and systems having a foot-operated pedal assembly to accelerate or decelerate vehicle engine speed and/or output on a temporary basis to override a hand lever set throttle position. The pedal and systems herein disclosed possess a double-acting spring linkage to absorb override movement of the foot pedal during such temporary acceleration or deceleration and to re-establish the original set hand throttle speed upon cessation of the override mode. An anti-feedback device prevents the throttle set position from being altered during acceleration or deceleration of engine speed and/or output.

15 Claims, 10 Drawing Figures

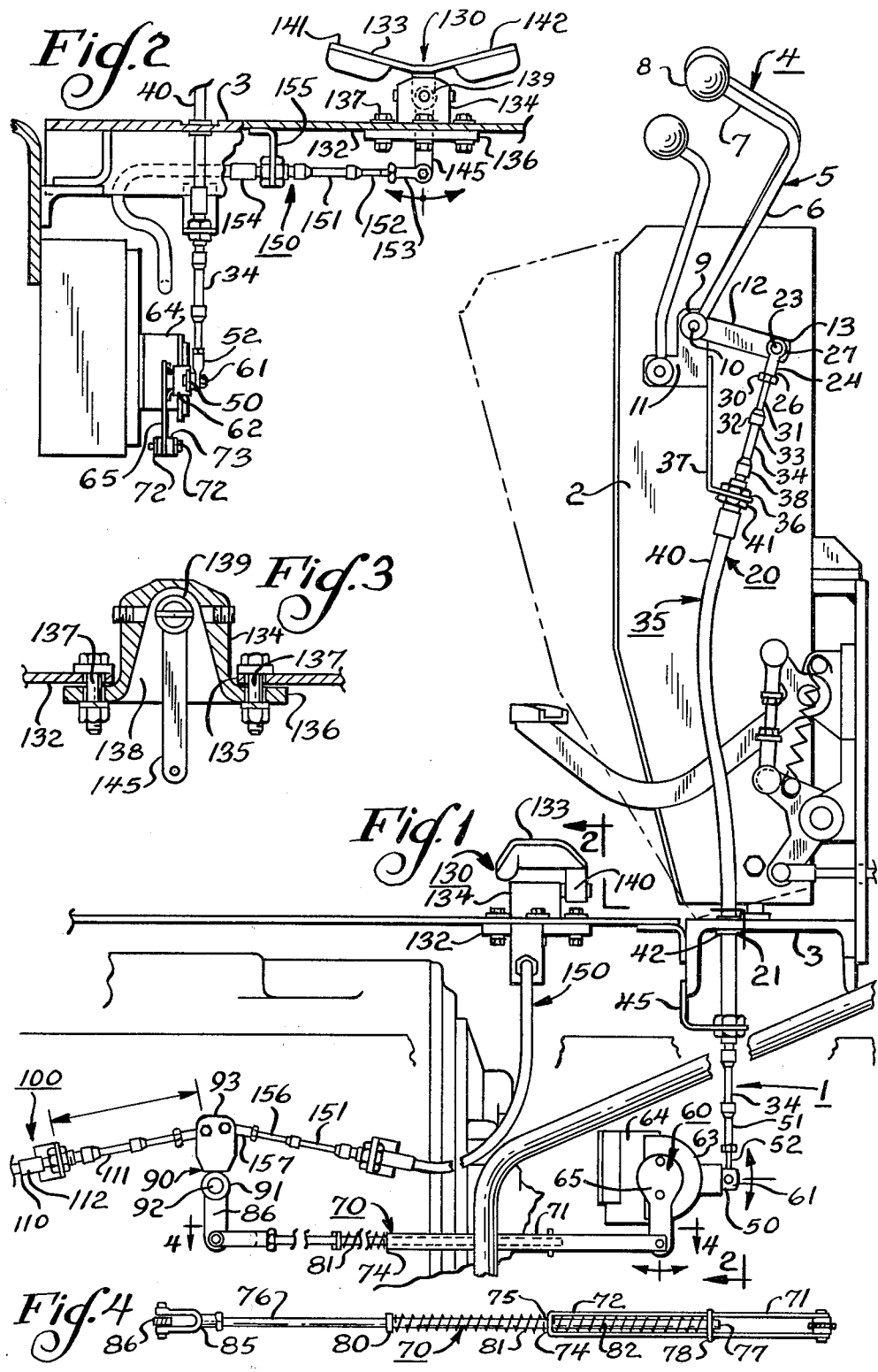

ACCELERATOR/DECELERATOR PEDAL AND SYSTEM

BACKGROUND OF THE INVENTION

This invention relates in general to vehicles and, in particular, to an engine control system.

More specifically, but without restriction to the particular use which is shown and described, this invention relates to an accelerator/decelerator pedal and system having foot-operated control means to selectively accelerate or decelerate a vehicle engine on a temporary basis to override a hand lever set throttle position.

In operation of many types of construction and industrial machinery, engine speed is controlled by means of a hand lever or throttle generally positioned adjacent to the steering wheel and control lever console of such vehicles. As the vehicle moves or the engine provides an output in response to a particular throttle setting, load and terrain conditions vary whereby it becomes necessary for an operator to accelerate or decelerate the machinery to perform a work task or operate the vehicle safely. For example, the set speed of the throttle may establish a vehicle speed which is too fast to manuever in a curve or down an incline whereby it is necessary that the vehicle be decelerated to operate safely or effectively. In other situations, other conditions may warrant a temporary increase in engine speed or output for efficient operation. After such temporary alteration in engine speed is effected, it is then desirable to resume the normal operation of the vehicle set by the throttle control to maintain the originally selected speed of operation.

To operate construction machinery under actual working conditions, an operator must perform many tasks such as, for example, steering or manipulation of the control levers of the equipment. Because an operator's hands thus may be otherwise occupied, it is inconvenient and impractical to constantly readjust the hand throttle to control engine speed as needed to adjust the variable conditions requiring alteration of engine speed and/or output. Many prior art techniques have been employed by which a foot-operated mehcanism may be operated in a manner to override engine speed, after which release of the pedal resumes the initial hand throttle setting. One known system providing an override capability is disclosed in U.S. Pat. No. 2,821,091 to Benner issued Jan. 28, 1958. Such prior art systems as disclosed in the Benner patent are nevertheless deficient in providing an efficient and convenient foot override pedal while attaining positive and efficient temporary acceleration/deceleration as required.

SUMMARY OF THE INVENTION

It is, therefore, an object of this invention to improve the control of the ground speed and/or engine output of a vehicle.

Another object of the invention is to attain instantaneous deceleration or acceleration of engine speed and/or output.

A further object of the invention is to override the throttle set position of an engine through manipulation of a foot-operated device.

Still another object of this invention is to restore automatically a throttle set speed setting of engine speed and/or output upon temporary acceleration or deceleration of a vehicle engine.

These and other objects are attained in accordance with the present invention wherein there are provided improved accelerator/decelerator pedal and systems having an improved foot-operated means to effect an alteration of engine speed or output in an instantaneous manner as conditions warrant in operation of a vehicle. The improved system herein disclosed accomplishes convenient and effective temporary override of a hand throttle set setting for instantaneous control of engine speed and/or output without disturbing the hand set throttle position when the override mode is terminated. The invention of the application provides effective and economical systems with improved sealing and noise attenuating capabilities.

BRIEF DESCRIPTION OF THE DRAWINGS

Further objects of the invention, together with additional features contributing thereto and advantages accruing therefrom, will be apparent from the following description of several embodiments of the invention which are shown in the accompanying drawings with like reference numerals indicating corresponding parts throughout wherein:

FIG. 1 is a schematic side view of a portion of one embodiment of the accelerator/decelerator pedal and system according to the present invention;

FIG. 2 is a partial front schematic view of the accelerator/decelerator pedal and system taken along lines 2—2 of FIG. 1;

FIG. 3 is an enlarged side sectional view of the foot pedal mounting bracket and actuator lever shown in FIG. 2;

FIG. 4 is a top schematic view of the double acting spring linkage of the accelerator/decelerator pedal and system of the invention taken along lines 4—4 of FIG. 1;

DETAILED DESCRIPTION OF THE FURTHER EMBODIMENTS

Figure 5:
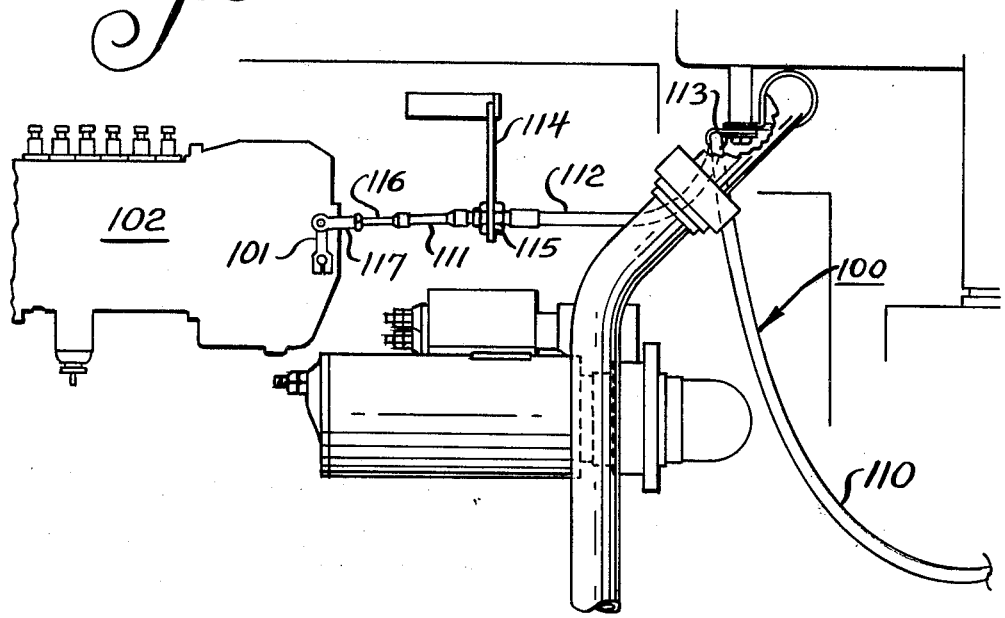
FIG. 5 is a partial side schematic view of another portion of the accelerator/decelerator pedal and system of the invention operatively coupled to the portion of the invention illustrated in FIG. 1.

Referring now to FIGS. 1 to 6, there is shown one embodiment of the accelerator/decelerator pedal and system of the invention, generally designated by reference numeral 1, and operatively mounted on a vehicle such as a construction or industrial machine in the form of a road grader and the like. In the embodiment as illustrated in FIG. 1, the accelerator/decelerator pedal and system 1 is coupled to a steering wheel and control lever console 2 which is mounted onto a floor panel 3 of the vehicle at a position forward of the operator thereof. Although the accelerator/decelerator pedal and system 1 may be employed in connection with any suitable type of vehicle console or panel, one suitable adjustable steering wheel and control level console is disclosed in co-pending application to Koch, Ser. No. 90,567 filed Nov. 2, 1979 entitled Adjustable Steering Wheel and Control Lever Console, to which reference is made herein. The console 2 carries a plurality of control levers 4 pivotally mounted in a conventional manner on console 2 whereby one of the levers acts as a pivotally mounted, hand lever throttle 5 operatively connected by linkage means of the invention, to be described in detail later, to an engine speed and/or output control device such as an injection pump.

The throttle lever 5 possesses an elongated lever handle 6 having an end portion 7 angularly disposed toward an operator and carrying a knob 8 for convenient manual manipulation. The lever handle 7 includes an integral sleeve 9 mounted for rotation about a shaft 10 carried on a console bracket 11. A second throttle lever 12 is affixed to sleeve 9 for pivotal movement about shaft 10 through which movement of lever 12 is transmitted to an improved throttle linkage assembly 20 of the invention attached to an end 13 of the lever 12.

The floor panel 3 includes an opening 21 through which a portion of throttle linkage assembly 20 extends from the throttle lever 12 in a manner that will be apparent. The throttle linkage assembly 20 is attached to the end 13 of lever 12 by means of a linkage shaft 23 extending through a hole in lever 12 and coupling a rod end 24 of throttle linkage assembly 20. The rod end 24 includes a shaft having a lower female threaded open end 26 and an upper opening 27 through which shaft 23 couples the rod to lever 12 for pivotal movement as illustrated in FIG. 1. The linkage shaft 23 is in the form of a nut and bolt assembly to attach rod end 24 to lever 12 and the portion of the rod end 24 surrounding opening 27 may include a bearing surface, if desired, to permit more efficient relative movement between lever 12 and rod end 24. A jam nut 30 attaches a threaded shaft 31 to the female end 26 of the rod end 24 whereby the opposite end of the shaft 31 is attached by means of ferrule 32 to the end 33 of an inner cable 34 of a cable assembly 35 of the throttle linkage assembly 20 of the invention.

The cable assembly 35 is supported by flange 36 of a bracket 37 affixed to console bracket 11 and a threaded nut coupling 38 of an outer cable 40 in the form of a fixed sheath-like member is retained in an opening in flange 36 by a pair of pinch nuts 41. The inner cable 34 and outer cable 40 extend downward through a sealing grommet 42 in a floor opening 21, and the outer cable is attached, in the same manner as its upper end is attached to flange 36, to a flange of a lower bracket 45, affixed to floor panel 3. The inner cable 34 projects beyond bracket 45 and is coupled to a lever 50 through a shaft 51 and a rod end 52 of identical construction as described in relation to the coupling of the throttle assembly linkage 20 to lever 12. The rod end 52 secures the cable assembly 35 to the lever 50 which forms part of a bell crank mechanism 60, known as a quadrastat control device, by means of a nut and bolt arrangement 61. As shown in FIGS. 1 and 2, the lever 50 is pivotally mounted on a hub 62 mounted for rotation on a plate 63 affixed to a bracket 64. The hub 62 carries a plate-like lever arm 65 which, together with quadrastat 50, acts as a bell crank but prevents feedback to the hand throttle lever 5 when override is effected as will be apparent from the following description.

The output lever 65 is coupled to a dual acting collapsible spring assembly 70 of throttle linkage means 20 to which a force is transmitted by movement of the hand throttle lever 5. An end of the spring linkage assembly 70 includes a yoke member 71, as best shown in FIGS. 1, 2 and 4. One end 72 of the yoke member 71 is affixed by a cotter pin or the like to the quadrastat output lever 65 by means of a yoke pin extending through aligned holes in the end of the lever 65 and in a pair of spaced members 72 of the yoke. The lever 65 and the members 72 are spaced by washers 73.

Spaced members 72 comprise a pair of parallel elongated side elements terminating with an integral end member 74 having a central opening 75. An elongated rod 76 is disposed in opening 75 and is mounted for longitudinal movement relative to yoke member 71. One end 77 of rod 76 is carried by yoke member 71 by means of a guide plate 78 affixed to rod 76 by suitable attachment means and having side notches interfitting with spaced members 72 of the yoke 71. The rod 76 further carries an affixed spring stop 80 disposed in spaced relationship to yoke 71. A pair of collapsible resilient springs 81 and 82 respectively extend between spring stop 80 and yoke end member 74, and yoke end member 74 and guide plate 78. The opposite end of rod 76 is attached by a threaded coupling to a yoke 85 which attaches lever 86 of a second bell crank 90. As will be clear from the foregoing description, the pair of collapsible springs 81 and 82 of the spring linkage assembly 70 permit an override of the engine speed and/or output established by the hand throttle lever 5 and re-establish the original throttle setting upon cessation of the override mode. The spring linkage assembly 70 positively transmits force generated though movement of throttle lever 5 without relative movement between yoke 71 and rod 76.

Figure 6:
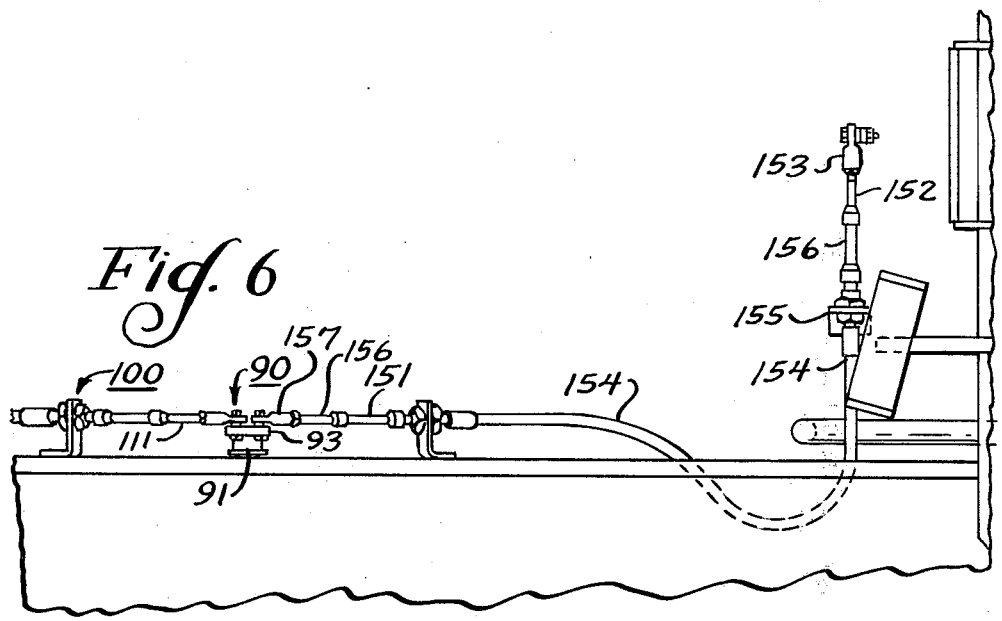
FIG. 6 is a top partial schematic view of the accelerator/decelerator pedal and system of FIG. 1.

Bell crank assembly 90 comprises a hub 91 rotatably mounted on a shaft 92 and supported on the vehicle frame by a bracket (not shown) as best illustrated in FIGS. 1 and 6. The bell crank assembly 90 supports an upper output lever 93 also mounted on hub 91 which, through a speed control linkage 100, couples movement of the hand throttle 5 to a control lever 101 of an injection pump 102 of the vehicle to control the speed and/or output of its engine as shown in FIG. 5. The speed control linkage 100 includes a cable assembly 110 having inner and outer cables 111 and 112 coupled to lever 93 in the same manner as the connection of throttle cable assembly 35 to the throttle lever 12. The extent of the speed control linkage 100 from bell crank 90 to the control lever 101 of the injection pump is illustrated in FIGS. 1 and 5 taken together. The speed control linkage may be supported on the vehicle frame or other components as needed for adequate retention by suitable support techniques, such as clip 113 of FIG. 5. The outer cable 112 is secured adjacent injection pump 102 to a bracket 114 by pinch nuts 115 in a manner as previously described, attaching the outer cable to bracket 37 mounted adjacent throttle lever 5. The inner cable 111 is secured to a shaft 116 and a rod end 117 is carried for movement on the pivotally mounted control lever 101 of the injection pump 102.

From the foregoing it should be apparent that the position of the hand throttle establishes, through the improved linkage of the invention, a corresponding position of the lever 101 of the injection pump 102 to control engine speed and/or output. During operation of the vehicle as was previously discussed, it becomes necessary to either accelerate or decelerate the engine speed on an instantaneous basis. Such acceleration or deceleration is attained by the invention of the application through manipulation of a foot pedal assembly 130 suitably positioned such as, for example, at the center of a floor plate 132 beneath the vehicle operator. As shown in FIGS. 2 and 3, the foot-operated pedal assembly 130 comprises a foot pedal 133 mounted on a dome-like bracket 134 which seals the floor from the passage of dust or noise from beneath the vehicle. Bracket 134 is positioned within an opening 135 which is provided through the floor plate 132, and includes an outer lip portion 136 extending beneath the floor plate 132 and is bolted thereto by bolt assemblies 137 situated adjacent the opening. The interior of the bracket 134 forms a dome-like enclosed chamber 138 in which a rotatably mounted, lateral shaft 139 extends therethrough and is secured to the bracket by any suitable technique (not shown). The foot pedal 133 is attached to one end of the pedal support shaft 139 by means of a mounting bracket 140 suitably affixed thereto. The mounting bracket 140 supports the pedal 132 at its upper end and the pedal includes a pair of sloped planar foot surfaces 141 and 142 which enable an operator to contact a selected surface to effect left or right pivotal movement of the pedal dependent on whether deceleration or acceleration of the engine speed and/or output is desired.

The selected movement of the foot pedal 132 is transmitted by means of a lever 145 integrally attached to the pedal support shaft 139 and extending downward through the bracket chamber 138 to a point disposed beneath the floor plate. The lever 145 swings about the axis of shaft 139 through the keying of an end thereto or other manner of attachment. Although the pedal can utilize other extents of the arcs of movement, the pedal may have an arcuate swing, respectively, from center to right and center to left of 15 degrees. The lower end of the lever 145 is attached to a foot pedal cable assembly 150, as shown in FIG. 2, through similar components employed to couple the hand throttle 5 to throttle cable assembly 35. The foot pedal cable assembly similarly includes an inner cable 151 coupled to the lever 145 by shaft 152 and rod end 153, and an outer cable 154 retained by bracket 155. The cable assembly extends outwardly and laterally of the vehicle, and is attached to bell crank lever 93 as a second input to bell crank 90 as shown in FIGS. 1 and 6. Inner cable 151 is attached to lever 93 by means of a shaft 156 and rod end 157 of the type previously disclosed. Movement in a selected direction of the foot pedal 132 will thus be transmitted through the foot cable assembly 150 to the bell crank 90, and in turn through the speed control linkage 100 to adjust the injection pump control lever 101.

In view of the dual inputs and coupling of the hand lever throttle 5 and foot pedal 132 to the bell crank 90, movement of the hand lever throttle 5 will be followed with similar movement by the foot pedal 132 when establishing a throttle set position. If an operator desires to override the hand throttle setting, the foot pedal is manipulated left or right by contacting one of its upper surfaces 141 and 142. Such selected movement of the pedal 132 either swings the bell crank lever 93 counterclockwise, when viewing FIG. 1, to accelerate engine speed and/or output, or clockwise to decelerate engine speed and/or output. Because of the improved dual acting spring linkage 70, coupled between the bell cranks 60 and 90, the temporary movement of the foot pedal 132 is absorbed therein without being transmitted back to the set position of the hand throttle 5. If the foot pedal 132 is manipulated to move the bell crank lever 93 clockwise or counterclockwise, the motion is transmitted through the bell crank lever 86 to rod 76. This will cause the end portion of the rod 76 to move relative to the yoke 71 and extend one of the springs 81 and 82 while compressing the other. The force required to alter the position of the throttle lever is greater than the generated spring force, because of the anti-feedback function provided by quadrastat control device 60, and thus the hand throttle setting is not disturbed. When the foot pedal 142 is released by the operator after acceleration or deceleration, the force differential, created by the extension and compression of the respective springs 81 and 82, causes the rod 86 to move back to its original position established by throttle lever 5. This causes the bell crank lever 93 to swing and return the foot pedal to its position prior to the override mode being effected. Thus, the operator may manipulate the foot pedal controlling the engine speed or output as often as desired without the position of the hand throttle being altered.

Figure 7:
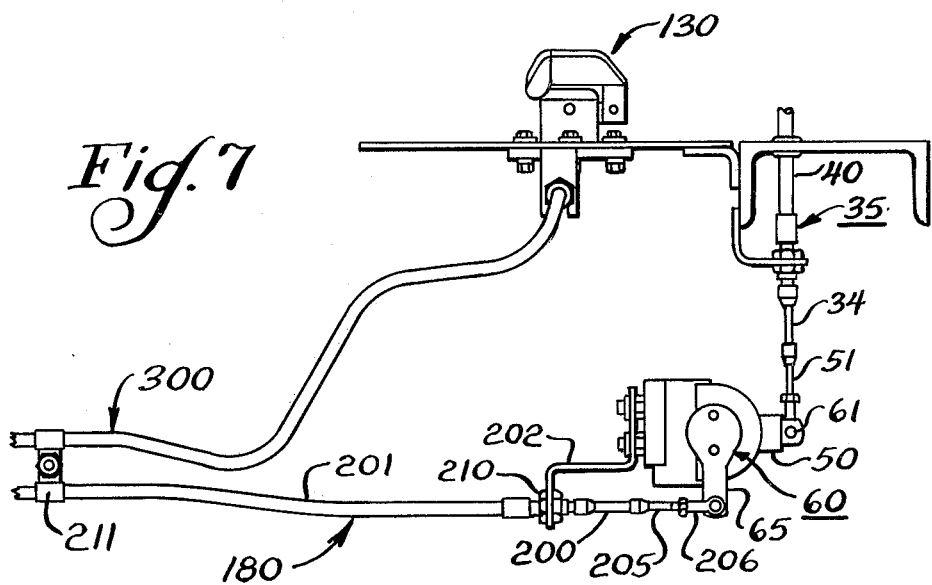
FIG. 7 is a partial schematic side view of a portion of another embodiment of the accelerator/decelerator pedal and system of the invention.
Figure 8:
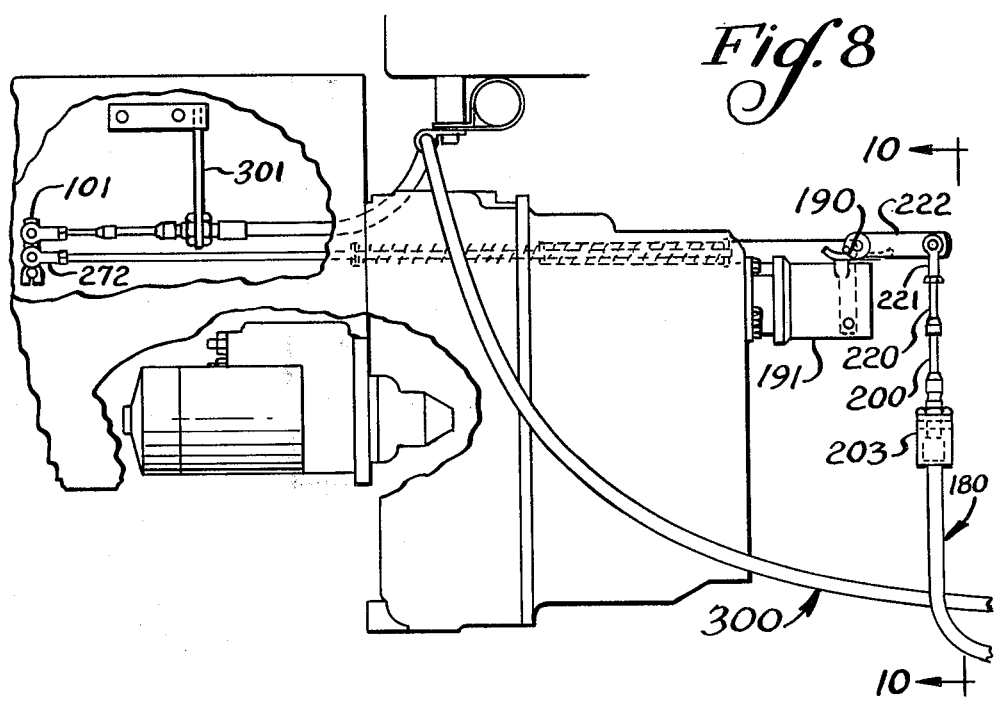
FIG. 8 is a partial side schematic illustration of another portion of the accelerator/decelerator pedal and system of the invention operatively coupled to the portion of the invention illustrated in FIG. 7.
Figure 9:
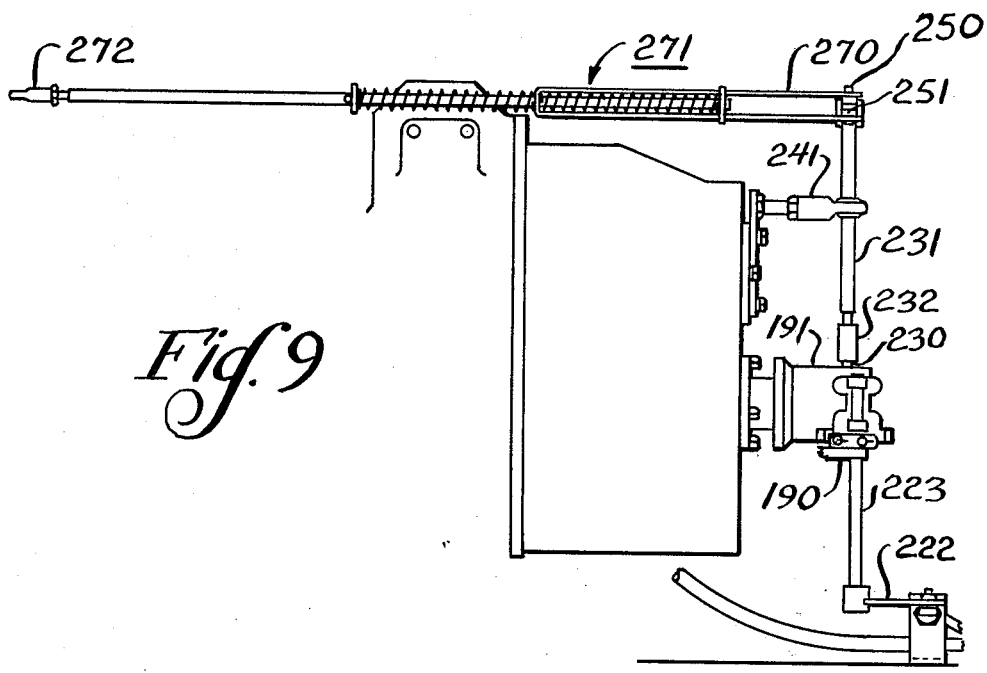
FIG. 9 is a partial front schematic view of the portion of the accelerator/decelerator pedal and system of FIG. 8.

Referring now to FIGS. 7 to 9, there is illustrated still another embodiment of the accelerator/decelerator pedal and system of the invention. The embodiment of FIGS. 6 to 9 is intended to be utilized in conjunction with a conventional governor which is used to maintain selected engine speed or output through control of the injection pump of a vehicle. The governor may comprise a device known as a tail shaft governor which senses ground speed or output in a conventional manner and suitably adjusts the injection pump to maintain a constant ground speed or output of the vehicle.

In the embodiment described with reference to FIGS. 7—10, the hand throttle 5, console 2, and associated upper cable assembly (now shown) extending through the vehicle floor panel, are identical to that described with reference to the foregoing embodiment of FIGS. 1—5. The cable assembly 34, operatively coupled to the hand lever throttle 5, is in turn connected to the quadrastat control system 60. The output of the quadrastat control 60, as determined by throttle 5, is transmitted through a cable assembly 180, of a construction similar to the cable linkage coupling the throttle lever 5 to the quadrastat device and the cables of other linkages described in the preceding embodiment. Cable assembly 180 directly couples lever 5 to an input 190 of a conventional governor 191 as shown in FIGS. 7 and 8 together, thus eliminating the double acting spring linkage 70 and second bell crank 90 utilized at this point in the throttle linkage of the previous embodiment. Cable assembly 180 includes an inner and outer cable 200 and 201 whereby brackets 202 and 203 are employed, respectively, adjacent the quadrastat lever 65 and governor input 190 to retain the outer cable 201. A shaft 205 is attached by means of a jam nut to the female end of a rod end 206 which is in turn coupled to lever 65. The shaft 205 includes an opposite end that is attached to an end of the inner cable 200 by a suitable coupling element as described previously. The inner cable 200 extends into outer cable 201 at the angle bracket 202 to which the outer cable is affixed by means of pinch nuts 210. The inner and outer cables 200 and 201 are retained in their extent along the vehicle by a bracket 211 and any other suitable retention means (not shown).

Figure 10:
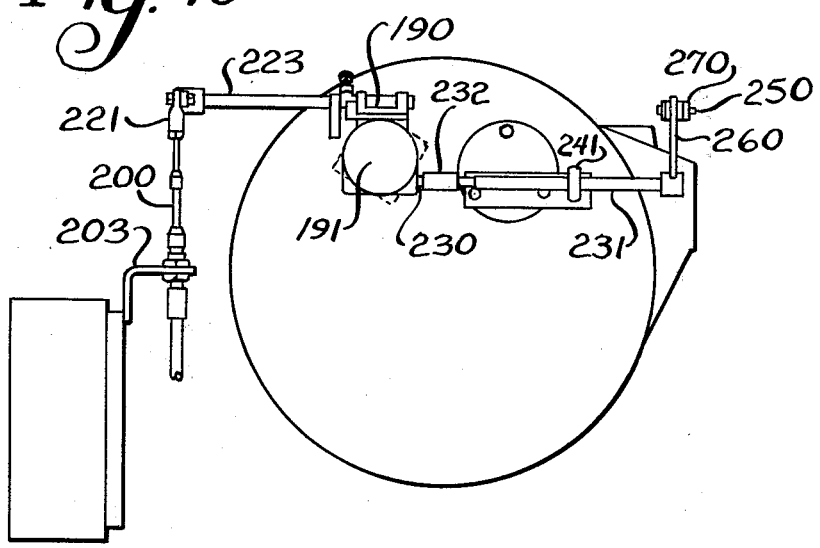
FIG. 10 is a front schematic view taken along line 10—10 of FIG. 8 of the portion of the accelerator/decelerator pedal and system.

The end of the outer cable 201 terminates adjacent the bracket 203 whereby the inner cable extends upward into a coupling relationship with a shaft 220 suitably affixed by a rod end 221 to a governor input lever 222. Lever 222 is journaled for rotation about an elongated shaft 223 which is coupled to the input 190 of a conventional governor to maintain the ground speed of the vehicle in accordance with the throttle setting regardless of the actual conditions encountered. As best shown in FIGS. 9 and 10, the engine speed or output is maintained by rotation of an output device 230 extending from the governor 191, which output movement is transmitted through a rotary mounted output shaft 231. The output device 230 is connected to shaft 231 by a coupling 232 having two spring pins (not shown) and the shaft extends substantially lateral of the vehicle and is braced by means of a suitably retained support 241 having an opening creating a bearing surface. The outer end of the shaft 231 is attached by means of a spring pin 250 to a lever hub 251 carrying an integrally coupled lever arm 260. Arm 260 is attached to the end of a yoke 270 of a dual acting spring linkage assembly 271 connecting pivotal movement of the lever arm 260 to the control lever 101 of the injection pump 102 of the engine. Double acting spring linkage 271 is identical to the spring linkage assembly 70 described with reference to the embodiment of FIGS. 1 to 5. The spring linkage assembly 271 is attached by means of yoke 272 to the control lever 101 of the injection pump.

It should be apparent that the throttle lever 5 sets a position of the governor which generates an output at output device 230 to control the injection pump to maintain a speed which is selected by the operator. To instantaneously override the throttle set position, the accelerator/decelerator pedal and system of the embodiment of FIGS. 7-10 also includes a foot pedal assembly 130 identical to that described with reference to the preceding embodiment. The foot pedal system 130 is attached to a cable assembly 300 of the type described heretofore, and extends through suitable brackets from beneath the foot pedal to a pivotal coupling relationship with the injection pump control lever 101. It should be noted that the end of the cable assembly 300 is supported by a flange 301 mounted in the general vicinity of the injection pump 102 to provide stability to the connection of the cable assembly 300 to the control lever 101. Thus, an operator may manipulate the foot pedal either left or right to accelerate or decelerate the engine speed and/or output and override the governor setting by direct linkage of the foot pedal to the injection pump control lever 101. The dual action spring linkage 271 absorbs the change of position of lever 101 to temporarily override the governor output, but allows the set throttle position to be maintained. The structure and function of the double acting spring linkage assembly 271 is accordingly similar as spring linkage assembly 70 of the first embodiment of the invention. In operation of the vehicle, the foot pedal 132 similarly follows the movement of the hand throttle 5.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Thereof, it is intended that the invention not be limited to the particular embodiments disclosed as the best mode contemplated for carrying out this invention, but that the invention will include all embodiments falling within the scope of the appended claims.

What is claimed is:

1. An accelerator/decelerator system for a vehicle comprising:

throttle means operatively coupled to a speed control device of a vehicle to control the engine speed or output thereof;

said throttle means including a manually adjustable member being movable in a range of positions to establish an engine speed or output in accordance with a selected one of said positions;

said throttle means further including throttle linkage means coupling said adjustable member to the speed control device of the vehicle;

override means to temporarily alter engine speed or output determined by a selected one of said positions of said adjustable member;

said override means including an actuator and override linkage means operatively coupling said actuator to the speed control device;

said actuator being mounted for selected override movement to control engine speed or output and override the engine speed or output determined by the adjustable member;

said throttle linkage means including spring linkage means operatively coupled to said override linkage means permitting engine speed or output to resume as determined by a selected one of said positions upon release of said actuator;

said actuator being a foot pedal mounted on a shaft for selected pivotal movement about an axis extending in a substantial longitudinal direction toward the operator's position of the vehicle to permit said foot pedal to be operated in a lateral plane, and said foot pedal being operated in a first lateral direction to accelerate engine speed or output and in a second lateral direction to decelerate engine speed or output.

2. The system according to claim 1 wherein said spring linkage means includes first and second force transmitting elements coupled to move in unison in response to movement of said adjustable member to a position determined thereby and one of said force transmitting elements coupled to move relative to the other element in response to said override movement of the actuator.

3. The system according to claim 2 wherein said first and second force transmitting elements are operatively coupled to resilient spring means responsive to override movement of said actuator and urging said one of the force transmitting elements to said position upon release of said actuator.

4. The system according to claim 3 wherein said resilient spring means includes a pair of double acting spring elements.

5. The system according to claim 1 further including anti-feedback means coupled to said throttle linkage means to prevent said override movement from altering said selected one of said positions of the adjustable member.

6. The system according to claim 5 wherein said anti-feedback means is a bell crank device.

7. The system according to claim 5 wherein said spring linkage means is operatively coupled to a second bell crank device.

8. The system according to claim 7 wherein said override linkage means is further operatively coupled to said second bell crank.

9. The system according to claim 7 further including additional linkage means coupling said second bell crank to an injection pump.

10. The system according to claim 9 wherein said spring linkage means is interposed between said first and second bell cranks.

11. The system according to claim 5 wherein said throttle linkage means is coupled to the input of a governor device controlling an injection pump.

12. The system according to claim 11 wherein said spring linkage means couples the output of the governor device to a control element of the injection pump to control the operation thereof as determined by the governor device in response to said selected position of said adjustable member.

13. The system according to claim 12 wherein said override linkage is coupled to the control element of the injection pump.

14. The system according to claim 1 wherein said shaft is coupled to a lever coupled to said override linkage means.

15. The system according to claim 14 wherein said shaft is supported on a bracket member forming an inner sealed chamber having at least a portion of said lever being disposed in said chamber.

* * * * *